(12) United States Patent
Watsuji et al.

(10) Patent No.: US 6,497,770 B2
(45) Date of Patent: Dec. 24, 2002

(54) FLUX-CONTAINING COMPOSITIONS FOR BRAZING ALUMINUM, FILMS AND BRAZING METHOD THEREBY

(75) Inventors: Takashi Watsuji, Youkaichi (JP); Haruzou Katou, Akashi (JP); Ken Matsumura, Shiga-ken (JP); Ken Kikuchi, Shiga-ken (JP)

(73) Assignee: Toyo Aluminium Kabushiki Kaisha, Osaka-fu (JP)

( * ) Notice: Subject to any disclaimer, the term of this patent is extended or adjusted under 35 U.S.C. 154(b) by 0 days.

(21) Appl. No.: 09/783,123

(22) Filed: Feb. 15, 2001

(65) Prior Publication Data

US 2002/0005230 A1 Jan. 17, 2002

(30) Foreign Application Priority Data

| Feb. 17, 2000 | (JP) | ........................ 2000-039921 |
| Feb. 17, 2000 | (JP) | ........................ 2000-039922 |
| Feb. 17, 2000 | (JP) | ........................ 2000-039923 |
| Feb. 17, 2000 | (JP) | ........................ 2000-039924 |

(51) Int. Cl.$^7$ .................. B23K 35/363; B23K 35/365
(52) U.S. Cl. ................................ 148/23; 148/24
(58) Field of Search ........................ 148/23, 24

(56) References Cited

U.S. PATENT DOCUMENTS

| 4,301,211 A | 11/1981 | Sloboda |
| 4,981,526 A | 1/1991 | Kudo et al. |
| 5,360,158 A | 11/1994 | Conn et al. |
| 5,690,271 A | 11/1997 | Dudel |
| 6,059,174 A | * 5/2000 | Kojima et al. .............. 228/183 |
| 6,203,628 B1 | 3/2001 | Katoh et al. |

FOREIGN PATENT DOCUMENTS

| EP | 0 512 489 | 11/1992 |
| EP | 0 936 024 | 8/1999 |
| EP | 0 980 738 | 2/2000 |
| GB | 2027617 A | 2/1980 |
| GB | 2 334 531 | 8/1999 |
| JP | 54043853 | 4/1979 |
| JP | 2681390 | 2/1991 |

* cited by examiner

Primary Examiner—Daniel J. Jenkins
(74) Attorney, Agent, or Firm—Nixon & Vanderhye P.C.

(57) ABSTRACT

A flux-containing composition for brazing aluminum containing a fluoride flux, a binder of an alkyd resin, a mixture of an acrylic resin and a butyl rubber (or a petroleum resin), and/or a polyethylene resin, an organic solvent, and optionally a metallic powder for brazing is easy for handling and plastic working of a product coated with it, gives brazed areas (fillets) of good appearance, has low cost and better operating environment, and is capable of application to members having complicated shapes.

12 Claims, 3 Drawing Sheets

FLUX-CONTAINING COMPOSITIONS FOR BRAZING ALUMINUM, FILMS AND BRAZING METHOD THEREBY

FIELD OF THE INVENTION

The present invention relates to a flux-containing composition comprising a metallic powder for brazing (also referred to as a brazing powder) useful for brazing aluminum materials to be jointed. The term "aluminum" referred to herein includes pure aluminum and its alloys otherwise specifically described.

Further, the present invention relates to an undried film resulting from a composition for brazing useful for brazing aluminum materials to be jointed and a brazing method through the undried film.

BACKGROUND OF THE INVENTION

In order to braze aluminum, brazing sheets have been often used. The brazing sheets used comprise cores made of alloys such as 3003 alloy, 3N03 alloy or the like clad with brazing materials such as 4343 alloy or 4045 alloy on either or both surfaces thereof. These numbers of four ciphers are as specified in JIS. Since such a clad brazing material is indispensably applied to areas other than those to be brazed, a cost of a final product is increased. And, a thickness of a clad material is limited by problems in the preparation of the clad material. The minimum thickness is about 60 μm since it is very difficult to industrially prepare a thinner clad material. Even prepared, the resultant clad material has a skin with an uneven thickness and therefore, its qualities and properties are not constant.

When brazing sheets are brazed, fluxes are essential. One type is fluxes to be applied to areas to be brazed immediately before brazing. However, it is difficult that most of the fluxes are completely dried due to their compositions. Even if dried, the flux is readily peeled off and dropped so that it is impossible to store and transport for a long period before brazing. And, processing, assembly and the like are also impossible.

Generally, a suspension comprising a flux mixed with water is applied by spraying or using any other means and dried before a brazing operation (step). However, the application of the suspension may scatter the flux over undesirable areas, which is not preferable for operating environment and health. On the other hand, when the drying before the brazing step is incomplete, water is left in a brazed area which may lower a brazing property and produce defects in the brazed area. Moreover, when water is contained as a medium, a flux is not well adhered to a brazing sheet. And, it is not evenly coated. Excess flux in areas to which much amounts of the flux are adhered may form gray or white stains, while areas to which less amounts of the flux are adhered may have an insufficient brazing property.

For overcoming the problems mentioned above, a method comprising adding a water soluble resin as a binder was proposed as disclosed in JP 6285682A. This method gives a final product with a commercially unattractive appearance since the reaction of the binder with the flux during brazing makes brazed areas dark. Even if the water soluble resin was used, the resultant film was readily peeled off and dropped due to its poor film-forming property. Thus, processing and assembly after the application of the flux were substantially impossible. The use of the resin of solvent type is not suitable for industrial preparation since the change in color of brazed areas and the production of cracks may occur irrespective of drying of the resultant film.

Recently, a brazing method in which an area to be brazed of an aluminum material is coated with a mixture of an aluminum-silicon brazing powder and a flux in place of the use of a brazing sheet has been proposed. This method solves the problem of costs, but the other problems mentioned above cannot be solved thereby.

SUMMARY OF THE INVENTION

The present inventors completed the present invention via repeated study. Thus, the present invention is directed to a composition, a film and a method as defined by the preferable embodiments A to D below.

A1. A flux-containing composition for brazing aluminum comprising:
- a) 10 to 70% by weight of a metallic powder for brazing,
- b) 2 to 50% by weight of a fluoride flux, and
- c) 1 to 15% by weight of at least one binder selected from the group consisting of an alkyd resin, a mixture of an alkyd resin and a butyl rubber, a mixture of an alkyd resin and a petroleum resin, a mixture of an alkyd resin, a butyl rubber and a petroleum resin, a mixture of an acrylic resin and a butyl rubber, a mixture of an acrylic resin and a petroleum resin and a mixture of an acrylic resin, a butyl rubber and a petroleum resin,
- the balance being substantially an organic solvent provided that the total is not more than 100% by weight.

A2. A flux-containing composition for brazing aluminum as defined in (A1) wherein the metallic powder for brazing is a powdery mixture of a pure aluminum powder and a silicon powder.

A3. A flux-containing composition for brazing aluminum as defined in (A1) wherein the metallic powder for brazing is a powdery mixture of a pure aluminum powder, a silicon powder and a zinc powder.

A4. A flux-containing composition for brazing aluminum as defined in (A1) which comprises a coupling agent.

A5. A film obtained by coating at least a part of a surface of an aluminum material with a paste composition as defined in (A1) to (A4) and then drying.

A6. An aluminum material coated with a paste composition as defined in (A1) to (A4) onto at least a part of its surface and then dried.

A7. A method of brazing an aluminum material comprising:
coating at least a part of a surface of the aluminum material with a paste composition for brazing aluminum comprising a) 10 to 70% by weight of a metallic powder for brazing, b) 2 to 50% by weight of a fluoride flux, and c) 1 to 15% by weight of at least one binder selected from the group consisting of an alkyd resin, a mixture of an alkyd resin and a butyl rubber, a mixture of an alkyd resin and a petroleum resin, a mixture of an alkyd resin, a butyl rubber and a petroleum resin, a mixture of an acrylic resin and a butyl rubber, a mixture of an acrylic resin and a petroleum resin and a mixture of an acrylic resin, a butyl rubber and a petroleum resin, the balance being substantially an organic solvent provided that the total is not more than 100% by weight;
drying; and then
brazing any other aluminum material.

B1. A flux-containing composition for brazing aluminum comprising a) 10 to 50% by weight of a fluoride flux and b) 0.1 to 10% by weight of at least one binder selected from the group consisting of a polyethylene resin, a mixture of a butyl rubber and a polyethylene resin, a mixture of a petroleum resin and a polyethylene resin and a mixture of a butyl rubber, a petroleum resin and a polyethylene resin, the balance being substantially an organic resin provided that the total is not more than 100% by weight.

B2. A flux-containing composition for brazing aluminum as defined in (B1) wherein the fluoride flux is at least one selected from the group consisting of $AlF_3$-KF, $KAlF_4$-$K_3AlF_6$, $K_3AlF_6$ and $KAlF_4$.

B3. A film obtained by coating at least a part of a surface of an aluminum brazing sheet with a flux composition as defined in (B1) or (B2) and then drying.

B4. An undried film obtained by coating at least a part of a surface of an aluminum brazing sheet with a flux composition as defined in (B1) or (B2).

B5. An aluminum brazing sheet having a film as defined in (B3) or (B4) onto at least a part of its surface.

B6. A method of brazing an aluminum material comprising:
   coating at least a part of a surface of an aluminum brazing sheet with a flux composition for brazing aluminum comprising a) 10 to 50% by weight of a fluoride flux and b) 0.1 to 10% by weight of at least one binder selected from the group consisting of a polyethylene resin, a mixture of a butyl rubber and a polyethylene resin, a mixture of a petroleum resin and a polyethylene resin and a mixture of a butyl rubber, a petroleum resin and a polyethylene resin, the balance being substantially an organic resin provided that the total is not more than 100% by weight;
   drying; and then
   brazing any other aluminum material.

B7. A method of brazing as defined in (B6) which is conducted in a close or open condition.

B8. A method of brazing an aluminum material comprising:
   coating at least a part of a surface of an aluminum brazing sheet with a flux composition for brazing aluminum comprising a) 10 to 50% by weight of a fluoride flux and b) 0.1 to 10% by weight of at least one binder selected from the group consisting of a polyethylene resin, a mixture of a butyl rubber and a polyethylene resin, a mixture of a petroleum resin and a polyethylene resin and a mixture of a butyl rubber, a petroleum resin and a polyethylene resin, the balance being substantially an organic resin provided that the total is not more than 100% by weight; and then
   brazing any other aluminum material through the resultant undried film.

B9. A method of brazing as defined in (B8) which is conducted in a close or open condition.

C1. A flux-containing composition for brazing aluminum comprising:
   (a) 10 to 70% by weight of an alloy powder for brazing,
   (b) 2 to 50% by weight of a fluoride flux, and
   (c) 1 to 15% by weight of at least one binder selected from the group consisting of an alkyd resin, a mixture of an alkyd resin and a butyl rubber, a mixture of an alkyd resin and a petroleum resin, a mixture of an alkyd resin, a butyl rubber and a petroleum resin, a mixture of an acrylic resin and a butyl rubber, a mixture of an acrylic resin and a petroleum resin and a mixture of an acrylic resin, a butyl rubber and a petroleum resin,
   the balance being substantially an organic solvent provided that the total is not more than 100% by weight.

C2. A paste composition for brazing aluminum as defined in (C1) wherein the alloy powder for brazing is an aluminum-silicon alloy powder of an average particle size ranging from 2 to 100 $\mu$m.

C3. A flux-containing composition for brazing aluminum as defined in (C1) wherein the alloy powder for brazing is an aluminum-silicon-zinc alloy powder of an average particle size ranging from 2 to 100 $\mu$m.

C4. A flux-containing composition for brazing aluminum comprising:
   (a) 10 to 70% by weight of a powdery mixture comprising an aluminum-silicon alloy powder of an average particle size ranging from 2 to 100 $\mu$m and a zinc powder,
   (b) 2 to 50% by weight of a fluoride flux, and
   (c) 1 to 15% by weight of at least one binder selected from the group consisting of an alkyd resin, a mixture of an alkyd resin and a butyl rubber, a mixture of an alkyd resin and a petroleum resin, a mixture of an alkyd resin, a butyl rubber and a petroleum resin, a mixture of an acrylic resin and a butyl rubber, a mixture of an acrylic resin and a petroleum resin and a mixture of an acrylic resin, a butyl rubber and a petroleum resin,
   the balance being substantially an organic solvent provided that the total is not more than 100% by weight.

C5. A flux-containing composition for brazing aluminum as defined in any one of (C1) to (C4) which comprises a coupling agent.

C6. A film obtained by coating at least a part of a surface of an aluminum material with a paste composition as defined in any one of (C1) to (C5) and then drying.

C7. An aluminum material coated with a paste composition as defined in any one of (C1) to (C5) onto at least a part of its surface and then dried.

C8. A method of brazing an aluminum material comprising:
   coating at least a part of a surface of the aluminum material with a paste composition for brazing aluminum comprising (a) 10 to 70% by weight of an alloy powder for brazing or a powdery mixture of an alloy powder for brazing and a zinc powder, (b) 2 to 50% by weight of a fluoride flux, and (c) 1 to 15% by weight of at least one binder selected from the group consisting of an alkyd resin, a mixture of an alkyd resin and a butyl rubber, a mixture of an alkyd resin and a petroleum resin, a mixture of an alkyd resin, a butyl rubber and a petroleum resin, a mixture of an acrylic resin and a butyl rubber, a mixture of an acrylic resin and a petroleum resin and a mixture of an acrylic resin, a butyl rubber and a petroleum resin, the balance being substantially an organic solvent provided that the total is not more than 100% by weight;
   drying; and then
   brazing any other aluminum material.

D1. An undried film for brazing obtained by coating at least a part of an aluminum material with a composition comprising
   a) 10 to 70% by weight of a metallic powder for brazing,
   b) 2 to 70% by weight of a fluoride flux, and c) 0.1 to 10 % by weight of at least one binder selected from the group consisting of a butyl rubber, a petroleum resin and a polyethylene resin,
   the balance being substantially an organic solvent provided that the total is not more than 100% by weight.

D2. An undried film for brazing as defined in (D1) wherein the metallic powder for brazing is a powdery mixture of a pure aluminum powder of an average particle size ranging from 1 $\mu$m to 10 $\mu$m and a silicon powder of an average particle size ranging from 0.1 $\mu$m to 10 $\mu$m.

D3. An undried film for brazing as defined (D1) wherein the metallic powder for brazing is a powdery mixture of a pure aluminum powder of an average particle size ranging from 1 $\mu$m to 10 $\mu$m, a silicon powder of an average particle size ranging from 0.1 $\mu$m to 10 $\mu$m and a zinc powder of an average particle size ranging from 0.1 $\mu$m to 10 $\mu$m.

D4. An undried film for brazing as defined in (D1) wherein the metallic powder for brazing is an aluminum-silicon alloy powder of an average particle size ranging from 2 to 100 μm.

D5. An undried film for brazing as defined in (D1) wherein the metallic powder for brazing comprises an aluminum-silicon alloy powder of an average particle size ranging from 2 to 100 μm and a zinc powder of an average particle size ranging from 0.1 μm to 10 μm.

D6. An undried film for brazing as defined in (D1) wherein the metallic powder for brazing comprises an aluminum-silicon-zinc alloy powder of an average particle size ranging from 2 to 100 μm.

D7. An aluminum material having an undried film for brazing as defined in any one of (D1) to (D6).

D8. A method of brazing an aluminum material comprising:
coating at least a part of a surface of an aluminum material with a composition comprising a) 10 to 70% by weight of a metallic powder for brazing, b) 2 to 70% by weight of a fluoride flux, and c) 0.1 to 10% by weight of at least one binder selected from the group consisting of a butyl rubber, a petroleum resin and a polyethylene resin, the balance being substantially an organic solvent provided that the total is not more than 100% by weight; and then brazing any other aluminum material through the resultant undried film.

D9. A method as defined in (D8) wherein the brazing is conducted in a close or open condition.

DETAILED DESCRIPTION OF THE INVENTION

Figure 1:
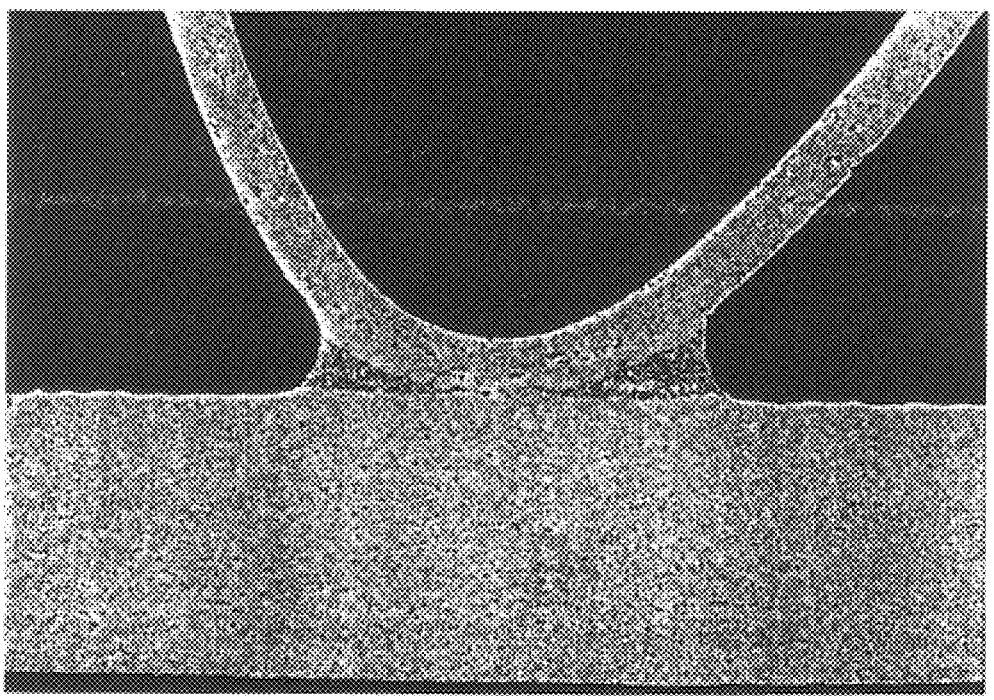
FIG. 1 is a photograph showing a cross section near an area brazed with the flux-containing composition 5 of Example A (×100).
Figure 2:
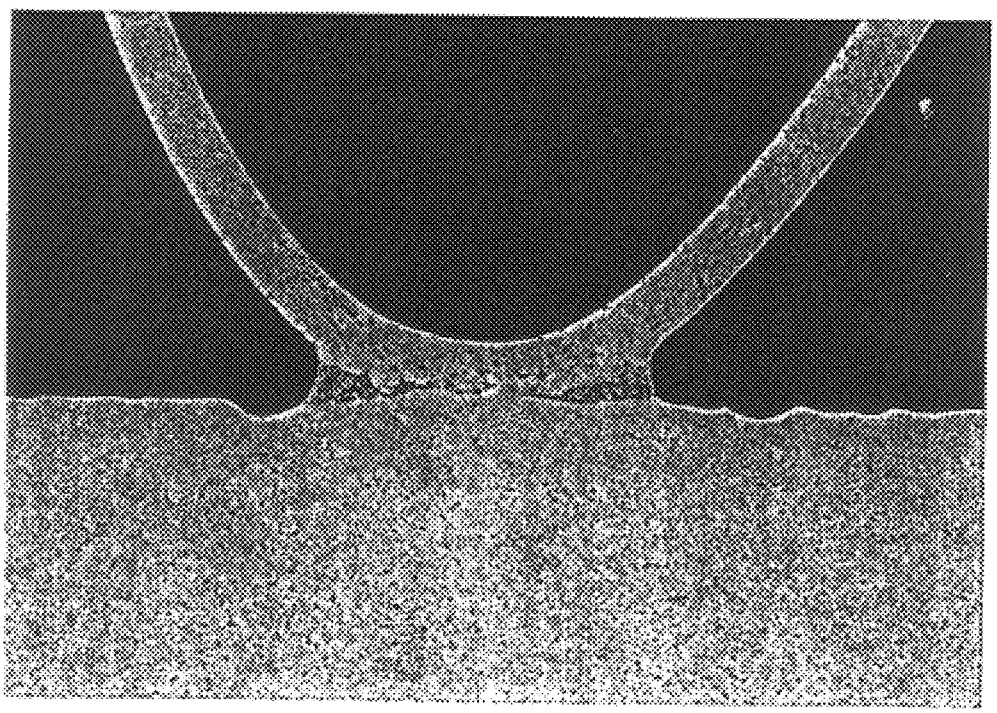
FIG. 2 is a photograph showing a cross section near an area brazed with the flux-containing composition 2 of Comparative Example A (×100).
Figure 3:
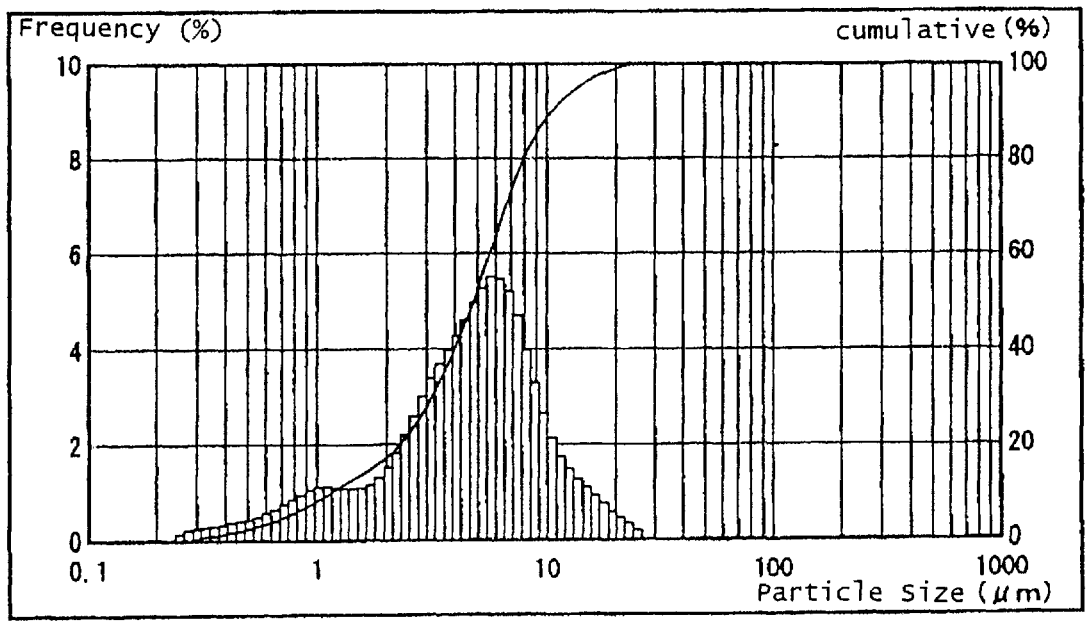
FIG. 3 is a graph showing a particle size distribution and an average particle size of the metallic silicon powder used in Example A.
Figure 4:
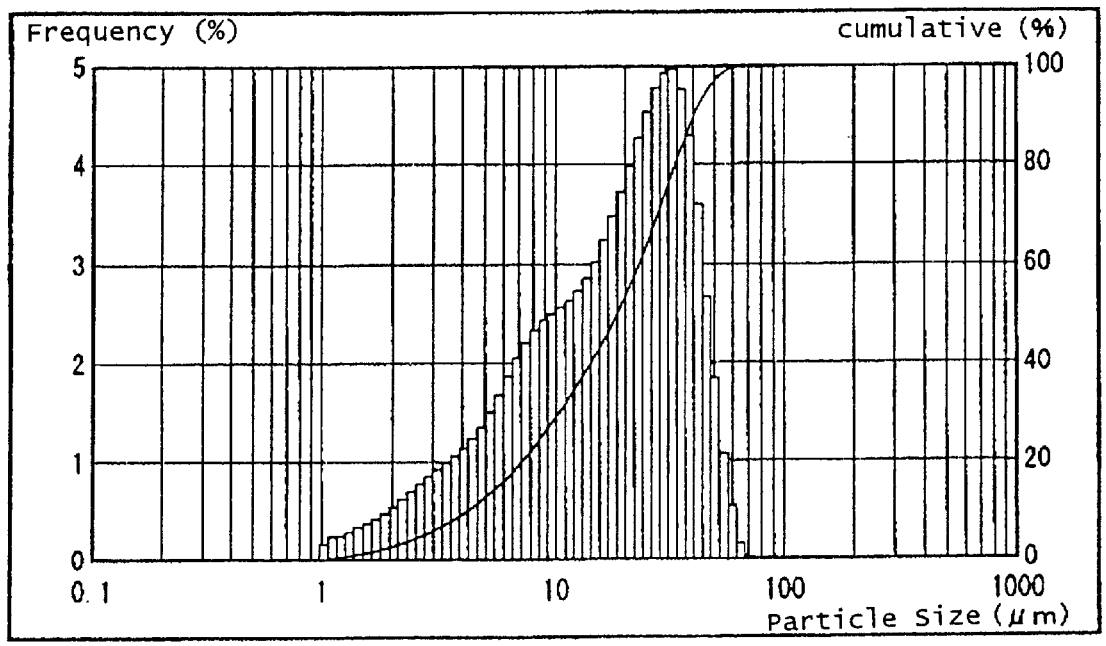
FIG. 4 is a graph showing a particle size distribution and an average particle size of the metallic silicon powder used in Comparative Example A.

Examples of the fluoride flux used in the present invention include fluoride fluxes such as $AlF_3$-$KF$, $KAlF_4$-$K_3AlF_6$, $K_3AlF_6$ and $KAlF_4$. Particularly, "Nocolok (trade name)" from Alcan Aluminum Limited based on $K_3AlF_6$ and $KAlF_4$ is preferable.

The Preferable Embodiment A:
An amount of the flux in the flux-containing composition is 2 to 50% by weight, preferably about 5 to 30% by weight. When the amount of the flux is less than 2% by weight, the flux cannot exert its action sufficiently. On the other hand, the amount of above 50% by weight is a surplus leading to the increase in costs.

The Preferable Embodiment B:
An amount of fluoride flux is suitably 10 to 50% by weight, preferably 20 to 40% by weight per 100% of the total composition. When it is less than 10% by weight, the flux does not exert its action sufficiently. On the other hand, the amount of above 50% by weight is a surplus leading to the increase in costs.

The Preferable Embodiment C:
An amount of the flux in the flux-containing composition is 2 to 50% by weight, preferably about 5 to 30% by weight. When the amount of the flux is less than 2% by weight, the flux cannot exert its action sufficiently. On the other hand, the amount of above 50% by weight is a surplus leading to the increase in costs.

The Preferable Embodiment D:
An amount of the flux in the composition for brazing is 2 to 70% by weight, preferably about 5 to 50% by weight. When the amount of the flux is less than 2% by weight, the flux cannot show its function sufficiently. On the other hand, the amount of above 70% by weight is a surplus leading to the increase in costs.

Examples of the binder used in the present invention are below.

The Preferable Embodiment A:
As the resin/rubber acting as a binder in the paste composition, at least one binder selected from the group consisting of an alkyd resin, a mixture of an alkyd resin and a butyl rubber, a mixture of an alkyd resin and a petroleum resin, a mixture of an alkyd resin, a butyl rubber and a petroleum resin, a mixture of an acrylic resin and a butyl rubber, a mixture of an acrylic resin and a petroleum resin and a mixture of an acrylic resin, a butyl rubber and a petroleum resin can be used. The butyl rubber is preferably a copolymer of isobutylene and isoprene having a molecular weight ranging from 250,000 to 550,000. The petroleum resin usable is at least one selected from a C5 petroleum resin, a C9 petroleum resin and a C5C9 copolymer petroleum resin, preferably having a molecular weight ranging from about 600 to about 2,000. The acrylic resin having a molecular weight ranging from 100 to 1,000,000 is suitable. An amount of the binder is preferably 1 to 15% by weight, more preferably 2 to 10% by weight. The amount of less than 1% by weight is not preferable since when the flux composition is applied to an aluminum material, it runs down due to its poor viscosity and its adhesion to the aluminum material becomes worse. On the other hand, the amount of above 15% by weight is a surplus leading to the increase in costs.

The Preferable Embodiment B:
As the binder in the flux-containing composition, at least one binder selected from a polyethylene resin, a mixture of a butyl rubber and a polyethylene resin, a mixture of a petroleum resin and a polyethylene resin and a mixture of a butyl rubber, a petroleum resin and a polyethylene resin is used. When the resultant film is not be dried, a butyl rubber, a petroleum resin, a mixture of a butyl rubber and a petroleum resin or the like may be used as the binder. An amount of the binder is preferably 0.1 to 10% by weight, more preferably 0.5 to 5% by weight, per 100% by weight of the total composition. The amount of less than 0.1% by weight is not preferable since when the flux composition is applied to an aluminum material, it runs down due to its poor viscosity and its adhesion to the aluminum material becomes worse. On the other hand, the amount of above 10% by weight is a surplus leading to the increase in costs. The butyl rubber is preferably a copolymer of isobutyrene and isoprene having a molecular weight ranging from 250,000 to 550,000. As the petroleum resin, one or more selected from $C_5$ petroleum resin, $C_9$ petroleum resin, and $C_5C_9$ copolymer petroleum resin can be used, $C_5C_9$ copolymer petroleum resin being particularly preferable. Preferable molecular weight of the petroleum resin is about 600 to 2,000.

The Preferable Embodiment C:
As the resin/rubber acting as a binder in the flux-containing composition, at least one binder selected from the group consisting of an alkyd resin, a mixture of an alkyd resin and a butyl rubber, a mixture of an alkyd resin and a petroleum resin, a mixture of an alkyd resin, a butyl rubber and a petroleum resin, a mixture of an acrylic resin and a butyl rubber, a mixture of an acrylic resin and a petroleum resin and a mixture of an acrylic resin, a butyl rubber and a petroleum resin can be used. The butyl rubber is preferably a copolymer of isobutylene and isoprene having a molecular weight ranging from 250,000 to 550,000. The petroleum resin usable is at least one selected from a C5 petroleum resin, a C9 petroleum resin and a C5C9 copolymer petroleum resin, preferably having a molecular weight ranging from about 600 to about 2,000. The acrylic resin having a molecular weight ranging from 100 to 1,000,000 is suitable. An amount of the binder is preferably 1 to 15% by weight, more preferably 2 to 10% by weight. The amount of less than 1% by weight is not preferable since when the flux composition is applied to an aluminum material, it runs down due to its poor viscosity and its adhesion to the aluminum material becomes worse. On the other hand, the amount of above 15% by weight is a surplus leading to the increase in costs.

The Preferable Embodiment D:

As the resin/rubber acting as a binder in the composition for brazing, at least one binder selected from the group consisting of a butyl rubber, a petroleum resin and a polyethylene resin can be used. That is, a butyl rubber, a petroleum resin, a polyethylene resin or a combination thereof can be used. The butyl rubber is preferably a butyl rubber comprising a copolymer of isobutylene and isoprene having a molecular weight ranging from 250,000 to 550,000. The petroleum resin usable is at least one selected from a C5 petroleum resin, a C9 petroleum resin and a C5C9 copolymer petroleum resin, preferably having a molecular weight ranging from about 600 to about 2,000. The polyethylene resin having a molecular weight of above 10,000, preferably ranging from >10,000 to 1,000,000 is desirable. An amount of the binder is preferably 0.1 to 10% by weight, more preferably 0.5 to 5% by weight. The amount of less than 0.1% by weight is not preferable since when the flux composition is applied to an aluminum material, it runs down due to its poor viscosity and its adhesion to the aluminum material becomes worse. On the other hand, the amount of above 10% by weight is a surplus leading to the increase in costs.

Any organic solvents can be used in the present invention as long as the binder is soluble therein. For example, toluene, hexane, octane, cyclohexane, ethylene glycol monohexyl ether or the like, or a mixture thereof can be used. A suitable amount of the organic solvent is added in order to control a viscosity and the like of the flux-containing composition. Specifically, 0.1 to 87% by weight, preferably 5 to 70% by weight of the organic solvent may be added.

As the metallic powder for brazing used in the present invention, a powdery mixture of a pure metal and/or an aluminum alloy powder can be used. For example, a powdery mixture of a pure aluminum powder and a silicon powder, a powdery mixture of a pure aluminum powder, a silicon powder and a zinc powder, a powdery mixture of an aluminum-silicon alloy powder and a zinc powder, a powder of an aluminum-silicon alloy, an aluminum-zinc alloy and an aluminum-silicon-zinc alloy can be used as the metallic powder for brazing according to the present invention. If necessary, one or more element(s) such as Cu, Bi, Mg, Sb, Ba, and the like can be added in an amount of about 5% by weight or less per 100% of the metallic component.

Although any elements contained as indispensable impurities in the alloy powder for brazing are not particularly limited, elements such as Fe, Mn, Ti, Ni, Cr and the like in an amount ranging from several ppm to about 1% by weight may be incorporated. However, it is better to reduce the amount of Fe which is present as one of impurities as little as possible since Fe may affect the corrosion resistance after brazing.

Generally, these powders can be obtained according to an atomization, a pulverization, a rotary disc method, a rotary electrode method, a cavitation method, a melt spinning method or a combination thereof. Of course, commercially available powder may be used as it is. The metallic powder has any form such as spheres, flats, plates, teardrops, needles, ellipsoids, monolithic and the like. The pure aluminum powder or the aluminum alloy powder obtained by atomizing in an argon or nitrogen gas is preferably usable. An oxygen content in these powders is varied with its particle size and its form and it is preferably 1.5% by weight or less. If it is above 1.5% by weight, an oxide film is firmly attached so that the powder may not be melt or a flowability of the powder may be lowered. An average particle size (as determined according to the method for determining a particle size distribution by laser diffraction) of the pure aluminum powder and the aluminum alloy powder is preferably 1 to 10 $\mu$m and 2 to 100 $\mu$m (desirably 5 to 50 $\mu$m), respectively. The powder having an average particle size of less than 1 $\mu$m for the pure aluminum powder or less than 2 $\mu$m for the aluminum alloy powder is not preferable since it contains much oxygen, it is easily coagulated in the composition and its cost is higher. The powder having an average particle size of 10 $\mu$m or more for the aluminum powder or 100 $\mu$m or more for the aluminum alloy powder is not preferable since the film resulting from the composition containing such a powder is too thick so that a brazed product has a poor dimensional accuracy and the powder may not be evenly dispersed in the composition.

A suitable amount of silicon contained in the metallic powder for brazing is 5 to 85% by weight per 100% of the metallic component if the metallic powder is a powdery mixture of a pure aluminum powder and a silicon powder or a powdery mixture of a pure aluminum powder, a silicon powder and a zinc powder. It is 3 to 17% by weight if the metallic powder is an aluminum-silicon alloy powder, a powdery mixture of an aluminum-silicon alloy powder and a zinc powder or an aluminum-silicon-zinc alloy powder. Silicon and aluminum are used in the form of elements (powdery mixture) or in the form of their alloy. This is the reason that an alloy obtained by alloying the silicon in the above amount with aluminum has a low melting point and a good flowability in a molten state. Particularly, when silicon is alloyed with an aluminum material at above an eutectic point (about 12% by weight of silicon in equilibrium diagram), the alloy is molten at a brazing temperature so that a flowability is increased. When both aluminum and silicon are mixed in the form of elements and used as a powdery mixture, a pure aluminum powder having a purity of 99.0% by weight or more, desirably 99.7% by weight or more and a silicon powder having a purity of 90.0% by weight or more, desirably 97.0% by weight or more may be used. The powder having the purity lower than that defined above is not preferable since much iron as an impurity is contained and it affects an anti-corrosion property after brazing. An average particle size of the silicon powder is preferably 0.1 to 30 $\mu$m, desirably 0.1 to 10 $\mu$m. The powder having an average particle size of less than 0.1 $\mu$m is not preferable since much oxygen and other impurities are contained. The powder having an average particle size of above 30 μm or more is not preferable since it may not be evenly dispersed in the composition.

It is possible to add a zinc powder in an amount of 3 to 60% by weight, preferably 10 to 50% by weight, per 100% by weight of the metallic component to the powdery mixture of the pure aluminum powder and the silicon powder in order to obtain a sacrificial anticorrosion effect.

An average particle size of the zinc powder is preferably 0.1 to 30 μm, desirably 0.1 to 10 μm. The zinc powder having an average particle size of less than 0.1 μm is not preferable since much oxygen and other impurities are contained. On the other hand, the zinc powder having an average particle size of above 30 μm is not preferable since the powder may not be evenly dispersed. When the zinc powder consisting of zinc element is used, its purity may be 90.0% by weight or more, desirably 97.0% by weight of more. The zinc powder having a purity of less than 90% by weight is not preferable since much Pb as an impurity is contained and it affects an anti-corrosion property after brazing.

Similar to silicon, zinc may be used in the form of zinc element (powdery mixture) or an aluminum-zinc(-silicon) alloy.

Suitable amounts of silicon and zinc contained in the alloy powder for brazing are 3 to 17% by weight and 0 to 30% by weight per 100% of the metallic component, respectively since an alloy obtained by alloying aluminum with silicon and/or zinc in the above amount has a low melting point on brazing and a good flowability in a molten state.

An amount of the metallic powder or the alloy powder (all metallic components) for brazing in the paste composition for brazing of the present invention is 10 to 70% by weight, preferably 15 to 45% by weight, per 100% of the paste composition. If the amount of the metallic powder for brazing is less than 10% by weight, its performance as a brazing material is poor so that satisfactory fillets may not be formed. The amount of above 70% by weight is a surplus so that much amounts of the flux and the binder should be incorporated which leads to the increase in costs.

Known additives can be added to the paste composition of the present invention. For example, an antioxidant, an anticorrosive agent, an antifoaming agent, a thickener, a plasticizer, a dispersing agent, a tackifier, a coupling agent and the like can be added if necessary. Particularly, a coupling agent is effective in order to improve an adhesion of a film. Its addition of about 0.001 to 1.0% by weight is effective. Among the coupling agents, a titanate coupling agent is particularly effective.

The flux-containing composition of the present invention in a necessary amount is applied to at least a part of a surface of an aluminum material, i.e. an area to be brazed on a surface of an aluminum material with an average thickness as below.

The Preferable Embodiment A:

An average thickness of the film after drying is preferably 1 to 100 μm, more preferably 1 to 50 μm, even more preferably 1 to 10 μm. When the average thickness is less than 1 μm, brazing is possible, but a brazing strength may be poor. On the other hand, when the average thickness is above 100 μm, it is a surplus leading to the increase in cost. However, when the paste composition of the present invention is used for closing holes or filling up gaps, the thickness of above 100 μm can be used.

The Preferable Embodiment B:

An average thickness of the resultant film after drying is preferably 0.5 to 50 μm, more preferably 1.5 to 20 μm. When the average thickness is less than 0.5 μm, a sufficient brazing property is not obtained due to less amount of the flux. On the other hand, when the average thickness is above 50 μm, the resultant film may have a bad appearance since excess flux is left. In addition, costs may be increased. An applied amount of the flux composition when the resultant film is not to be dried is suitably 1 to 300 g/m$^2$, preferably 3 to 100 g/m$^2$. When it is less than 1 g/m$^2$, the composition does not exert a sufficient flux action due to less applied amount. On the other hand, when the applied amount is above 300 g/m$^2$, the fillets after brazing has a bad appearance since excess flux is left.

The Preferable Embodiment C:

An average thickness of the film after drying is preferably 3 to 500 μm, more preferably 10 to 150 μm. When the average thickness is less than 3 μm, brazing is possible, but a brazing strength may be poor. On the other hand, when the average thickness is above 500 μm, it is a surplus leading to the increase in cost. However, when the paste composition of the present invention is used for closing holes or filling up gaps, the thickness of above 500 μm can be used.

The Preferable Embodiment D:

When the resultant film is not to be dried, an applied amount of the composition is suitably 1 to 300 g/m$^2$, preferably 1 to 100 g/m$^2$. The applied amount of less than 1 g/m$^2$ is not preferable since sufficient fillets may not be formed due to less applied amount. On the other hand, the applied amount of above 300 g/m$^2$ is a surplus and it may affect an appearance after brazing. When the resultant film is to be dried, an average thickness of the film after drying is preferably 3 to 500 μm, more preferably 10 to 150 μm. When the average thickness is less than 3 μm, brazing is possible, but a brazing strength may be poor. On the other hand, when the average thickness is above 500 μm, it is a surplus leading to the increase in cost. However, when the composition for brazing of the present invention may be used for closing holes or filling up gaps, the thickness of above 500 μm can be used.

The flux-containing composition of the present invention can be applied according to the known method. It can be applied using a brush, a spray, a roller coater, a bar coater, a doctor blade or the like. Alternatively, an aluminum material may be simply dipped in the paste composition of the present invention.

After the application of the flux-containing composition, the resultant film is generally dried at room temperature. If necessary, the drying temperature may be about 30 to 150° C. Any known brazing method can be employed without limiting. Preferably, brazing is conducted in an oven. Brazing in oven is suitable for industrial production since a lot of products can be brazed simultaneously without any additional assistance. The brazing temperature will be varied with the composition, but it is generally about 450 to 630° C. The brazing atmosphere is preferably a non-oxidizing atmosphere such as vacuum, argon, nitrogen and the like. An oxygen concentration in the brazing atmosphere is 200 ppm or less, desirably 100 ppm or less. If it is above 200 ppm, the flux does not exert its action sufficiently and the alloy powder is oxidized so that a brazing may become worse.

Alternatively, the flux-containing composition of the present invention can be applied to an aluminum material capable of being brazed. It can be used for brazing members constituting heat exchangers such as heater cores, evaporators and condensers, for example, fins, pins, pipes, tubes, plates and the like so that the members are joined. Of course, it can be applied to various parts other than the heat exchangers, for example, various mechanical parts, structural parts, sports goods, OA appliances, household articles and the like.

The remakable advantages of the present invention are summarized as below.

Advantages of The Present Invention

1. Since the flux-containing composition of the present invention has an excellent adhesion to an aluminum material, the resultant film after drying is not readily peeled off or dropped. Therefore, a product coated with the paste composition can be easily handled after coating. Further, a product coated with the flux-contaning composition comprising a butyl rubber can be more easily subjected to plastic working after coating.
2. Since the selected binder used in the flux-containing composition of the present invention is thermally decomposed by elevating the temperature during brazing, brazed areas (fillets) after brazing have good appearance. And, the change into dark color and the production of white residues do not occur.
3. Since the flux-containing composition of the present invention can be dried at room temperature by selecting a suitable organic solvent, the increase in costs is prevented. And, since the satisfactory film is obtained even after drying, dusts and the like are not produced and operating environment is better.
4. Since the flux-containing composition of the present invention has a suitable viscosity by varying an amount of a solvent and other factor(s), it can be applied to members having complicated forms and members having irregular and/or indented surfaces.
5. The brazing method of the present invention can be conducted in existing plants without using an extra apparatus or device.
6. By using the flux-containing composition of the present invention, a very thin film for brazing can be prepared. Therefore, a brazed product has an improved dimensional accuracy.

EXAMPLES A1–A9 AND COMPARATIVE EXAMPLES A1–A5

Paste compositions were prepared by mixing components according to formulations as shown in Tables A1 and A2. One surface of a 3003 aluminum panel (60×50×2 mm) was coated with each of the thus-prepared paste compositions using a brush to form a film having an average dry thickness of 9 $\mu$m (Examples) or 20 $\mu$m (Comparative Examples). Then, each panel was heated at 105° C. for 5 minutes in order to completely evaporate toluene used as an organic solvent for dilution. The resultant coated panel was evaluated as follows:

Film-forming Property

○ Film was dry to the touch.
X Film was not dry to the touch.

Adhesion

A Film was not peeled off even if rubbed with a finger vigorously.
B Film was not peeled off even if rubbed with a finger softly.
C Film was peeled off by rubbing with a finger, but it was not peeled off by tapping.
D Film was peeled off by tapping.
E Not evaluated since no film was formed.

Folding Property

○ When the coated panel was folded at an angle of 180° using a round rod of 10 mm in diameter, neither peeling off nor crack of the film was observed.
Δ When the coated panel was folded at an angle of 180° using a round rod of 10 mm in diameter, crack of the film was observed, but the film was not peeled off.
X When the coated panel was folded at an angle of 180° using a round rod of 10 mm in diameter, both peeling off and crack of the film were observed.

Each coated panel after heating or brazing was also evaluated as follows:

Odor

An odor of a gas released from an oven during heating and brazing in the following test was checked.

A Almost no or slight odor was detected.
B Odor was detectable, but it did not affect operations.
C Foreign and somewhat noticeable odor was detected.
D Unpleasant odor affecting operations was detected.
E Smell was detected and operations had to be stopped.

Formation of Fillets (Appearance)

A 3003 aluminum plate was stood perpendicularly at the center of the coated surface of the coated panel as prepared above, temporarily fasten with a stainless wire, and then kept in an oven at 600° C. under nitrogen atmosphere (nitrogen gas flow=4 Nm$^3$/h; oxygen concentration in oven= 50 ppm) for three minutes to be brazed. After cooling, a brazed area of the panel taken out of the oven was visually observed to evaluate the formation of fillets.

A Fillets were satisfactorily formed. That is, the fillets were evenly formed around the brazed area.
B Fillets were somewhat unevenly formed.
C Fillets were very unevenly formed.
D Fillets were not sufficiently formed.
E Brazing could not effected.

As clear from the above results, the brazing with the paste composition of the present invention was almost satisfactory in all properties.

TABLE A1

| | (Examples) | | | | | | | | |
|---|---|---|---|---|---|---|---|---|---|
| | composition | | | | | | | | |
| | 1 | 2 | 3 | 4 | 5 | 6 | 7 | 8 | 9 |
| components | amount (% by weight) | | | | | | | | |
| metallic powder for brazing[1] | 10.1 | 10.1 | 10.1 | 10.1 | 10.1 | 10.1 | 16.8 | 16.8 | 16.8 |
| metallic powder for brazing[2] | 11.2 | 11.2 | 11.2 | 11.2 | 11.2 | 11.2 | 11.2 | | |
| metallic powder for brazing[3] | 6.7 | 6.7 | 6.7 | 6.7 | 6.7 | 6.7 | 6.7 | 11.2 | 11.2 |

TABLE A1-continued (Examples)

composition, amount (% by weight)

| components | 1 | 2 | 3 | 4 | 5 | 6 | 7 | 8 | 9 |
|---|---|---|---|---|---|---|---|---|---|
| fluoride flux[4] | 28.0 | 28.0 | 28.0 | 28.0 | 28.0 | 28.0 | 28.0 | 28.0 | 28.0 |
| EXXON BUTYL 268[5] | 2.0 | | | | 2.0 | | 2.0 | 2.0 | 2.0 |
| TOHO HIGHRESIN 120[6] | | 2.0 | | | | 2.0 | | | 2.0 |
| HARIPHTHAL 3011[7] | 4.0 | 4.0 | 6.0 | 2.0 | | | | | |
| JOHNCRYL 611[8] | | | | | 4.0 | 4.0 | 4.0 | 4.0 | 2.0 |
| coupling agent KR-TTS[9] | | | | | | | 0.04 | | |
| DISPARONE #305[10] | 0.3 | 0.3 | 0.3 | 0.3 | 0.3 | 0.3 | 0.3 | 0.3 | 0.3 |
| toluene | 37.7 | 37.7 | 37.7 | 41.7 | 37.7 | 37.7 | 30.96 | 37.7 | 37.7 |
| total | 100 | 100 | 100 | 100 | 100 | 100 | 100 | 100 | 100 |
| film-forming property | ○ | ○ | ○ | ○ | ○ | ○ | ○ | ○ | ○ |
| adhesion | A | A | A | B | A | A | A | A | A |
| folding property | ○ | x | x | x | ○ | x | Δ | ○ | Δ |
| odor on brazing | B | B | B | A | B | B | B | B | B |
| formation of fillets | A | A | A | A | A | A | A | A | A |

[1]pure aluminum powder (average particle size = 8 μm; oxygen content = 0.36 wt%)
[2]zinc powder: zinc powder #3 (average particle size = 4 μm) manufactured by Sakai Chemical Ind.
[3]metallic silicon powder (average particle size = 4.8 μm)
[4]"Nocolok" flux: manufactured by Alcan Aluminum Limited
[5]butyl rubber: manufactured by Exxon Chemical
[6]petroleum resin: manufactured by Toho Chemical Industries
[7]alkyd resin: manufactured by Harima Chemicals
[8]acrylic resin: manufactured by Johnson Polymer
[9]titanate coupling agent (adhesion improver): manufactured by Ajinomoto Co., Ltd.
[10]hydrogenated castor oil (thickener): manufactured by Kusumoto Chemicals

TABLE A2

(Comparative Examples)

composition, amount (% by weight)

| components | 1 | 2 | 3 | 4 | 5 |
|---|---|---|---|---|---|
| metallic powder for brazing[1] | 10.1 | 10.1 | 10.1 | 10.1 | 10.1 |
| metallic powder for brazing[2] | 11.2 | 11.2 | 11.2 | 11.2 | 11.2 |
| metallic powder for brazing[16] | 6.7 | 6.7 | 6.7 | 6.7 | 6.7 |
| fluoride flux[4] | 28.0 | 28.0 | 28.0 | 28.0 | 28.0 |
| PEO 40[11] | 3.7 | | | | |
| BR-100[12] | | 3.7 | | | |
| AX-2000[13] | | | 3.7 | | |
| POLYBIS 30SH[14] | | | | 3.7 | |
| VISTANEX LM-MS[15] | | | | | 3.7 |
| DISPARONE #305[10] | 0.3 | 0.3 | 0.3 | 0.3 | 0.3 |
| toluene | 40.0 | 40.0 | 40.0 | 40.0 | 40.0 |
| film-forming property | ○ | ○ | ○ | x | x |
| adhesion | C | A | A | C | C |
| bending property | x | x | ○ | ○ | ○ |
| odor on brazing | B | C | C | C | A |
| formation of fillets | A | C | C | A | A |

[11]polyethylene oxide: manufactured by Sumitomo Seika Chemicals
[12]acrylic resin: manufactured by Mitsubishi Rayon
[13]polyvinyl alcohol: manufactured by Nippon Kagaku Gosei
[14]polybutene: manufactured by Nippon Oil and Fats Co.
[15]liquid polyisobutylene: manufactured by Exxon Chemical
[16]metallic silicon powder #301: manufactured by Alcan Aluminum Limited (average particle size = 18.6 μm)

EXAMPLES B1–B10 AND COMPARATIVE EXAMPLES B1 & B3–10

Flux compositions were prepared by mixing components according to formulations as shown in Tables B1 and B2. One surface of a 4045/3003/4045 brazing sheet (60×50×2 mm) was coated with each of the thus-prepared flux compositions in an amount of about 5 g/m² (when the drying step was omitted) or such that a dry film having an average dry thickness of 5 μm was prepared (when the drying step was included). For preparing a dry film, each sheet was heated at 105° C. for 5 minutes in order to completely evaporate toluene or ethylene glycol monohexyl ether used as an organic solvent for dilution. For the undried film, the drying was not performed after coating. The resultant coated panel was evaluated as follows:

○ Film was dry to the touch.

X Film was not dry to the touch.

Adhesion

A Film was not peeled off even if rubbed with a finger vigorously.

B Film was not peeled off even if rubbed with a finger softly.

C Film was peeled off by rubbing with a finger, but it was not peeled off by tapping.

D Film was peeled off by tapping.

E Not evaluated since no film was formed.

Folding Property

○ When the coated panel was folded at an angle of 180° using a round rod of 10 mm in diameter, neither peeling off nor crack of the film was observed.

Δ When the coated panel was folded at an angle of 180° using a round rod of 10 mm in diameter, crack of the film was observed, but the film was not peeled off.

X When the coated panel was folded at an angle of 180° using a round rod of 10 mm in diameter, both peeling off and crack of the film were observed.

Each coated panel after heating or brazing was also evaluated as follows:

Residual Carbon After Brazing

The coated panel was kept as it is (open condition) or while covered with an aluminum foil (close condition) in an oven under nitrogen gas atmosphere (nitrogen gas flow=4 $Nm^3/h$) until the substantial temperature of the panel went to 590° C. After 2 minutes, a brazed surface of the panel taken out of the oven was visually observed.

A Change into dark color was not observed at all.
B Some negligible dark spots were observed.
C Dark spots were clearly observed on the surface in a proportion of less than half of the total surface.
D Dark spots were clearly observed on the surface in a proportion of more than half of the total surface. Its commercial value was almost null.
E Panel looked dark totally. Its commercial value was null.

Odor

An odor of a gas released from the oven during the heating in the residual carbon test was checked.

A Almost no or slight odor was detected.
B Odor was detectable, but it did not affect operations.
C Foreign and somewhat noticeable odor was detected.
D Unpleasant odor affecting operations was detected.
E Smell was detected and operations had to be stopped.

Formation of Fillets (Appearance)

A 3003 aluminum plate was stood perpendicularly at the center of the coated surface of the coated panel as prepared above, temporarily fasten with a stainless wire, and then kept in an oven at 600° C. under nitrogen gas atmosphere (nitrogen gas flow=4 $Nm^3/h$; oxygen concentration in oven= 50 ppm) for three minutes in an open or close condition as described above orto be brazed. After cooling, a brazed area of the panel taken out of the oven was visually observed to evaluate the formation of fillets around the brazed areas.

A Fillets were satisfactorily formed. That is, the fillets were evenly formed around the brazed area.
B Fillets were somewhat unevenly formed.
C Fillets were very unevenly formed.
D Fillets were not sufficiently formed.
E Brazing could not conducted.

As clear from the above results, the brazing with the flux composition of the present invention was satisfactory in all properties.

TABLE B1

| | (Examples) | | | | | | | | | |
|---|---|---|---|---|---|---|---|---|---|---|
| | flux composition | | | | | | | | | |
| | 1 | 2 | 3 | 4 | 5 | 6 | 7 | 8 | 9 | 10 |
| components | amount (% by weight) | | | | | | | | | |
| fluoride flux[1] | 40.0 | 40.0 | 40.0 | 40.0 | 40.0 | 40.0 | 40.0 | 40.0 | 40.0 | 40.0 |
| EXXON BUTYL 268[2] | | 0.2 | | 0.2 | 2.5 | 2.5 | 2.5 | 2.5 | | 2.5 |
| TOHO HIGHRESIN 120[3] | | | | | | 0.5 | | 0.5 | 0.5 | 0.5 |
| A-C8 polyethylene[4] | 1.0 | 1.0 | 2.5 | 2.5 | | | 0.5 | 0.5 | 1.0 | 0.5 |
| DISPARONE #305[5] | 0.3 | 0.3 | 0.3 | 0.3 | 0.3 | 0.3 | 0.3 | 0.3 | 0.3 | 0.3 |
| toluene | | | 57.2 | 57.0 | 57.2 | 56.7 | 56.7 | 56.2 | 58.2 | |
| ethylene glycol monohexyl ether | 58.7 | 58.5 | | | | | | | | 56.2 |
| film-forming property | — | — | ○ | ○ | — | — | — | — | — | ○ |
| adhesion | — | — | B | B | — | — | — | — | — | B |
| folding property | — | — | Δ | ○ | — | — | — | — | — | ○ |
| residual carbon after brazing (open) | A | A | A | A | A | A | A | A | A | A |
| residual carbon after brazing (close) | A | A | A | A | B | C | B | C | B | A |
| odor on brazing | A | A | A | A | A | B | A | B | A | A |
| formation of fillets (open) | A | A | A | A | A | A | A | A | A | A |
| formation of fillets (close) | A | A | A | A | A | A | A | A | A | A |
| drying of film | no | no | yes | yes | no | no | no | no | no | yes |

[1]Nocolok flux: manufactured by Alcan Aluminum Limited
[2]butyl rubber: manufactured by Exxon Chemical
[3]petroleum resin: manufactured by Toho Chemical Industries
[4]polyethylene resin: manufactured by Tomen Plastic
[5]hydrogenated castor oil (thickener): manufactured by Kusumoto Chemicals

TABLE B2

| | (Comparative Examples) | | | | | | | |
|---|---|---|---|---|---|---|---|---|
| | composition | | | | | | | |
| | 1 | 3 | 4 | 5 | 7 | 8 | 9 | 10 |
| components | amount (% by weight) | | | | | | | |
| fluoride flux[1] | 40.0 | 40.0 | 40.0 | 40.0 | 40.0 | 40.0 | 40.0 | 40.0 |
| BR-100[6] | 3.7 | | | | 3.7 | | | |
| AX-2000[7] | | 3.7 | | | | 3.7 | | |
| MOBITAL 20H[8] | | | 3.7 | | | | 3.7 | |
| ethyl cellulose N-4[9] | | | | 3.7 | | | | 3.7 |
| DISPARONE #305[5] | 0.3 | 0.3 | 0.3 | 0.3 | 0.3 | 0.3 | 0.3 | 0.3 |
| toluene | | | | | 56.0 | 56.0 | 56.0 | 56.0 |
| ethylene glycol monohexyl ether | 56.0 | 56.0 | 56.0 | 56.0 | | | | |

TABLE B2-continued (Comparative Examples)

| components | composition |  |  |  |  |  |  |  |
|---|---|---|---|---|---|---|---|---|
| | 1 | 3 | 4 | 5 | 7 | 8 | 9 | 10 |
| | amount (% by weight) |  |  |  |  |  |  |  |
| film-forming property | — | — | — | — | ○ | ○ | ○ | ○ |
| adhesion | — | — | — | — | A | A | A | A |
| folding property | — | — | — | — | x | x | x | x |
| residual carbon after brazing (open) | D | D | D | D | D | D | D | D |
| residual carbon after brazing (close) | E | E | E | E | E | E | E | E |
| odor on brazing | C | C | C | C | C | C | C | C |
| formation of fillets (open) | C | C | C | C | C | C | C | C |
| formation of fillets (close) | E | E | E | E | E | E | E | E |
| drying of film | yes |  |  |  | no |  |  |  |

(6)acrylic resin: manufactured by Mitsubishi Rayon
(7)polyvinyl alcohol: manufactured by Nihon Gosei Kagaku Kogyo
(8)butyral resin: manufactured by Hoechst
(9)ethyl cellulose resin: manufactured by Dow Chemical

EXAMPLES C1–C10 AND COMPARATIVE EXAMPLES C1–4

Paste compositions were prepared by mixing components according to formulations as shown in Tables C1 and C2. One surface of a 3003 aluminum panel (60×50×2 mm) was coated with each of the thus-prepared paste compositions using a brush to form a film having an average dry thickness of 40 μm. Then, each panel was heated at 105° C. for 5 minutes in order to completely evaporate toluene used as an organic solvent for dilution. The resultant coated panel was evaluated as follows:

Film-forming Property

○ Film was dry to the touch.
X Film was not dry to the touch.

Adhesion

A Film was not peeled off even if rubbed with a finger vigorously.
B Film was not peeled off even if rubbed with a finger softly.
C Film was peeled off by rubbing with a finger, but it was not peeled off by tapping.
D Film was peeled off by tapping.
E Not evaluated since no film was formed.

Folding Property

○ When the coated panel was folded at an angle of 180° using a round rod of 10 mm in diameter, neither peeling off nor crack of the film was observed.
Δ When the coated panel was folded at an angle of 180° using a round rod of 10 mm in diameter, crack of the film was observed, but the film was not peeled off.
X When the coated panel was folded at an angle of 180° using a round rod of 10 mm in diameter, both peeling off and crack of the film were observed.

Each coated panel after heating or brazing was also evaluated as follows:

Odor

An odor of a gas released from an oven during heating (600° C.) to be brazed in the following test was checked.
A Almost no or slight odor was detected.
B Odor was detectable, but it did not affect operations.
C Foreign and somewhat noticeable odor was detected.
D Unpleasant odor affecting to operations was detected.
E Smell was detected and operations had to be stopped.

Formation of Fillets (Appearance)

A 3003 aluminum plate was stood perpendicularly at the center of the coated surface of the coated panel as prepared above, temporarily fasten with a stainless wire, and then kept in an oven at 600° C. under nitrogen gas atmosphere (nitrogen gas flow=4 Nm$^3$/h) for three minutes to be brazed. After cooling, a brazed area of the panel taken out of the oven was visually observed to evaluate the formation of fillets.
A Fillets were satisfactorily formed. That is, the fillets were evenly formed around the brazed area.
B Fillets were somewhat unevenly formed.
C Fillets were very unevenly formed.
D Fillets were not sufficiently formed.
E Brazing could not effected.

As clear from the above results, the brazing with the flux-containing composition of the present invention was satisfactory in all properties.

TABLE C1

(Examples)

| components | composition |  |  |  |  |  |  |  |  |  |
|---|---|---|---|---|---|---|---|---|---|---|
| | 1 | 2 | 3 | 4 | 5 | 6 | 7 | 8 | 9 | 10 |
| | amount (% by weight) |  |  |  |  |  |  |  |  |  |
| metallic powder for brazing[1] | 39.2 | 39.2 | 39.2 | 39.2 | 39.2 | 39.2 | 39.2 | 39.2 | 28.0 | |
| metallic powder for brazing[2] | | | | | | | | | 11.2 | |
| metallic powder for brazing[3] | | | | | | | | | | 39.2 |
| fluoride flux[4] | 16.8 | 16.8 | 16.8 | 16.8 | 16.8 | 16.8 | 16.8 | 16.8 | 16.8 | 16.8 |
| EXXON BUTYL 268[5] | 2.0 | | | | 2.0 | | 2.0 | 2.0 | 2.0 | 2.0 |
| TOHO HIGHRESIN 120[6] | | 2.0 | | | | 2.0 | 2.0 | | | |
| HARIPHTHAL 3011[7] | 4.0 | 4.0 | 6.0 | 2.0 | | | | | | |
| JOHNCRYL 611[8] | | | | | 4.0 | 4.0 | 2.0 | 4.0 | 4.0 | 2.0 |

TABLE C1-continued (Examples)

| | composition | | | | | | | | | |
|---|---|---|---|---|---|---|---|---|---|---|
| | 1 | 2 | 3 | 4 | 5 | 6 | 7 | 8 | 9 | 10 |
| components | amount (% by weight) | | | | | | | | | |
| coupling agent KR-TTS[9] | | | | | | | | 0.04 | | |
| DISPARONE #305[10] | 0.3 | 0.3 | 0.3 | 0.3 | 0.3 | 0.3 | 0.3 | 0.3 | 0.3 | 0.3 |
| toluene | 37.7 | 37.7 | 37.7 | 41.7 | 37.7 | 37.7 | 37.7 | 37.66 | 37.7 | 37.7 |
| film-forming property | ○ | ○ | ○ | ○ | ○ | ○ | ○ | ○ | ○ | ○ |
| adhesion | A | A | A | B | A | A | A | A | A | A |
| folding property | ○ | ○ | x | x | ○ | x | ○ | ○ | ○ | ○ |
| odor on brazing | B | B | B | A | B | B | B | B | B | B |
| formation of fillets | A | A | A | A | A | A | A | A | A | A |

[1] Al-12 wt % of Si alloy powder prepared by atomizing in nitrogen gas (average particle size = 30 μm; oxygen content = 0.07 wt %)
[2] Zn powder: zinc powder #3 (average particle size = 4 μm) manufactured by Sakai Chemical Ind.
[3] Al-12 wt % of Si-30 wt % of Zn alloy powder prepared by atomizing in nitrogen gas (average particle size = 30 μm; oxygen content = 0.09 wt %)
[4] "Nocolok" flux: manufactured by Alcan Aluminum Limited
[5] butyl rubber: manufactured by Exxon Chemical
[6] petroleum resin: manufactured by Toho Chemical Industries
[7] alkyd resin: manufactured by Harima Chemicals
[8] acrylic resin: manufactured by Johnson Polymer
[9] titanate coupling agent (adhesion improver): manufactured by Ajinomoto Co., Ltd.
[10] hydrogenated castor oil (thickener): manufactured by Kusumoto Chemicals

TABLE C2

(Comparative Examples)

| composition | 1 | 2 | 3 | 4 |
|---|---|---|---|---|
| components | amount (% by weight) | | | |
| metallic powder for brazing[1] | 39.2 | 39.2 | 39.2 | 39.2 |
| metallic powder for brazing[2] | | | | |
| metallic powder for brazing[3] | | | | |
| fluoride flux[4] | 16.8 | 16.8 | 16.8 | 16.8 |
| PEO 40[11] | 3.7 | | | |
| BR-100[12] | | 3.7 | | |
| AX-2000[13] | | | 3.7 | |
| POLYBIS 3OSH[14] | | | | 3.7 |
| DISPARONE #305[10] | 0.3 | 0.3 | 0.3 | 0.3 |
| toluene | 40.0 | 40.0 | 40.0 | 40.0 |
| film-forming property | ○ | ○ | ○ | X |
| adhesion | C | A | A | C |
| bending property | X | X | ○ | ○ |
| odor on brazing | B | C | C | C |
| formation of fillets | A | C | C | A |

[11] polyethylene oxide: manufactured by Sumitomo Seika Chemicals
[12] acrylic resin: manufactured by Mitsubishi Rayon
[13] polyvinyl alcohol: manufactured by Nippon Kagaku Gosei
[14] polybutene: manufactured by Nippon Oil and Fats Co.

EXAMPLES D1–D10 AND COMPARATIVE EXAMPLES D1–D4

Compositions for brazing were prepared by mixing components according to formulations as shown in Tables D1 and D2. One surface of a 3003 aluminum panel (60×50×2 mm) was coated with each of the thus-prepared paste compositions in an amount of 20 g/m² using a brush to form an undried film, which was evaluated as follows:

Each coated panel after heating or brazing was evaluated as follows:

Residual Carbon After Brazing (Residual Carbon Test)

The coated panel was kept as it is (open condition) or while covered with an aluminum foil (close condition) in an oven under nitrogen gas atmosphere (nitrogen gas flow=4 Nm³/h) until the substantial temperature of the panel went to 590° C. After for 2 minutes, a brazed surface of the panel taken out of the oven was visually observed.

A Change into dark color was not observed at all.

B Some negligible dark spots were observed.

C Dark spots were clearly observed on the surface in a proportion of less than half of the total surface.

D Dark spots were clearly observed on the surface in a proportion of more than half of the total surface. Its commercial value was almost null.

E Panel looked dark totally. Its commercial value was null.

Odor

An odor of a gas released from the oven during heating in the residual carbon test was checked.

A Almost no or slight odor was detected.

B Odor was detectable, but it did not affect operations.

C Foreign and somewhat noticeable odor was detected.

D Unpleasant odor affecting to operations was detected.

E Smell was detected and operations had to be stopped.

Formation of Fillets (Appearance)

A 3003 aluminum plate was stood perpendicularly at the center of the coated surface of the coated panel as prepared above and temporarily fasten with a stainless wire. Then, the panel was kept as it is (open condition) or while covered with an aluminum foil (close condition) in an oven at 600° C. under nitrogen gas atmosphere (nitrogen gas flow 4 Nm³/h; oxygen concentration in oven=50 ppm) for three minutes to be brazed. After cooling, a brazed area of the panel taken out of the oven was visually observed to evaluate the formation of fillets.

A Fillets were satisfactorily formed. That is, the fillets were evenly formed around the brazed area.

B Fillets were somewhat unevenly formed.

C Fillets were very unevenly formed.

D Fillets were not sufficiently formed.

E Brazing could not conducted.

As clear from the above results, the brazing using the undried composition resulting from coating of the composition for brazing of the present invention was satisfactory in all properties.

TABLE D1

(Examples)

| components | composition | | | | | | | | | |
|---|---|---|---|---|---|---|---|---|---|---|
| | 1 | 2 | 3 | 4 | 5 | 6 | 7 | 8 | 9 | 10 |
| | amount (% by weight) | | | | | | | | | |
| metallic powder for brazing[1] | 16.0 | 16.0 | 16.0 | 16.0 | 16.0 | 16.0 | 16.0 | | | |
| metallic powder for brazing[2] | | | | | | | | | 5.0 | |
| metallic powder for brazing[3] | 4.0 | 4.0 | 4.0 | 4.0 | 4.0 | 4.0 | 4.0 | | | |
| metallic powder for brazing[4] | | | | | | | | 20.0 | 15.0 | |
| metallic powder for brazing[5] | | | | | | | | | | 20.0 |
| fluoride flux[6] | 40.0 | 40.0 | 40.0 | 40.0 | 40.0 | 40.0 | 40.0 | 40.0 | 40.0 | 40.0 |
| EXXON BUTYL 268[7] | | 0.2 | 2.5 | 2.5 | 2.5 | 2.5 | | | | |
| TOHO HIGHRESIN 120[8] | | | | 0.5 | | 0.5 | 0.5 | | | |
| A-C8 polyethylene[9] | 1.0 | 1.0 | | | 0.5 | 0.5 | 1.0 | 1.0 | 1.0 | 1.0 |
| DISPARONE #305[10] | 0.3 | 0.3 | 0.3 | 0.3 | 0.3 | 0.3 | 0.3 | 0.3 | 0.3 | 0.3 |
| toluene | | | 37.2 | 36.7 | 36.7 | 36.2 | 38.2 | | | |
| ethylene glycol monohexyl ether | 38.7 | 38.5 | | | | | | 38.7 | 38.7 | 38.7 |
| residual carbon after brazing (open) | A | A | A | A | A | A | A | A | A | A |
| residual carbon after brazing (close) | A | A | A | A | A | A | A | A | A | A |
| odor on brazing | A | A | A | A | A | A | A | A | A | A |
| formation of fillets (open) | A | A | A | A | A | A | A | A | A | A |
| formation of fillets (close) | A | A | A | A | A | A | A | A | A | A |

[1]pure aluminum powder (average particle size = 8 μm; oxygen content = 0.36 wt%)
[2]zinc powder: zinc powder #3 (average particle size = 4 μm) manufactured by Sakai Chemical Ind.
[3]metallic silicon powder #301: manufactured by Alcan Aluminum Limited (average particle size = 25 μm)
[4]Al-12 wt % of Si alloy powder prepared by atomizing in nitrogen gas (average particle size = 30 μm; oxygen content = 0.07 wt %)
[5]Al-12 wt % of Si-30 wt % of Zn alloy powder prepared by atomizing in nitrogen gas (average particle size = 30 μm; oxygen content = 0.09 wt %)
[6]"Nocolok" flux: manufactured by Alcan Aluminum Limited
[7]butyl rubber: manufactured by Exxon Chemical
[8]petroleum resin: manufactured by Toho Chemical Industries
[9]polyethylene resin: manufactured by Tomen Plastic
[10]hydrogenated castor oil (thickener): manufactured by Kusumoto Chemicals

TABLE 12

(Comparative Examples)

| composition components | 1 | 2 | 3 | 4 |
|---|---|---|---|---|
| | amount (% by weight) | | | |
| metallic powder for brazing[1] | 16.8 | 16.8 | 16.8 | 16.8 |
| metallic powder for brazing[2] | | | | |
| metallic powder for brazing[3] | 11.2 | 11.2 | 11.2 | 11.2 |
| metallic powder for brazing[4] | | | | |
| metallic powder for brazing[5] | | | | |
| fluoride flux[6] | 28.0 | 28.0 | 28.0 | 28.0 |
| ethyl cellulose N-4[11] | 3.7 | | | |
| BR-100[12] | | 3.7 | | |
| AX-2000[13] | | | 3.7 | |
| POLYBIS 30SH[14] | | | | 3.7 |
| DISPARONE #305[10] | 0.3 | 0.3 | 0.3 | 0.3 |
| toluene | 40.0 | 40.0 | 40.0 | 40.0 |
| residual carbon after brazing (open) | D | D | D | D |
| residual carbon after brazing (close) | E | E | E | E |
| odor on heating | B | C | C | C |
| formation of fillets (open) | C | C | C | C |
| formation of fillets (close) | E | E | E | E |

[11]ethyl cellulose: manufactured by Dow Chemical
[12]acrylic resin: manufactured by Mitsubishi Rayon
[13]polyvinyl alcohol: manufactured by Nippon Kagaku Gosei
[14]polybutene: manufactured by Nippon Oil and Fats Co.

What is claimed is:

1. A flux-containing composition for brazing aluminum comprising:
    (a) a fluoride flux;
    (b) at least one binder selected from the group consisting of an alkyd resin, a polyethylene resin, and an acrylic resin; and
    (c) an organic solvent;
   wherein the composition further includes (d) at least one binder selected from the group consisting of a butyl rubber having a molecular weight in the range from 250,000 to 550,000 and a petroleum resin.

2. The flux-containing composition of claim 1, wherein the composition further includes at least one binder selected from the group consisting of a butyl rubber having a molecular weight in the range from 250,000 to 550,000 and a petroleum resin.

3. The flux-containing composition of claim 1, wherein the composition further includes (d) a metallic powder for brazing.

4. The flux-containing composition of claim 3, wherein the metallic powder for brazing is at least one member selected from the group consisting of an aluminum powder, a silicon powder, a zinc powder and an alloy powder thereof.

5. The flux-containing composition of any one of claims 1, 3 or 4, wherein the butyl rubber comprises a copolymer of isobutylene and isoprene.

6. The flux-containing composition of any one of claims 1, 3 or 4, wherein the fluoride flux is at least one flux selected from the group consisting of $AlF_3$-$KF$, $KAlF_4$-$K_3AlF_6$, $K_3AlF_6$ and $KAlF_4$.

7. The flux-containing composition of any one of claims 1, 3 or 4, wherein the composition further includes a coupling agent.

8. The flux-containing composition of any one of claims 1, 3 or 4, wherein an amount of the fluoride flux is 2 to 70% by weight, an amount of the binder is 0.1 to 15% by weight, an amount of the metallic powder is 10 to 70% by weight (if any), and the balance is the organic solvent, provided that the total is not more than 100% by weight.

9. An aluminum material coated with the flux-containing composition of claim 1 onto at least a part of an aluminum brazing sheet.

10. An aluminum material coated with the flux-containing composition of claims 3 or 4 onto at least a part of its surface.

11. A method of brazing an aluminum material comprising:
 (1) coating at least a part of a surface of the aluminum brazing sheet with the flux-containing composition of claim 1; and
 (2) brazing the aluminum brazing sheet with any other aluminum material by heating.

12. A method of brazing an aluminum material comprising:
 (1) coating at least a part of a surface of the aluminum material with the flux-containing composition of claims 3 or 4; and
 (2) brazing the aluminum material with any other aluminum material by heating.

* * * * *